July 24, 1928.
F. D. HERBERT ET AL
FILTER
Filed June 13, 1924
1,677,892
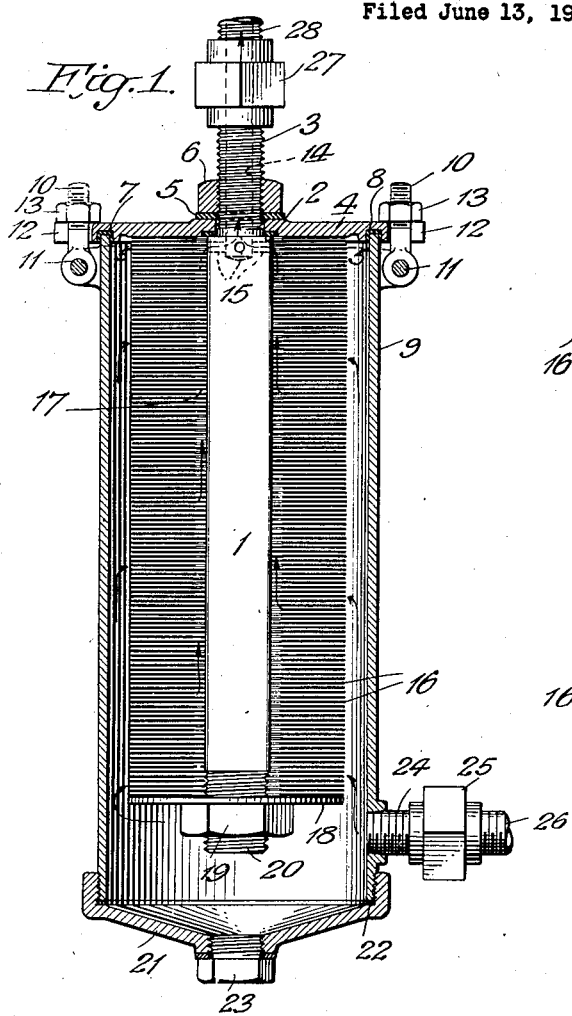
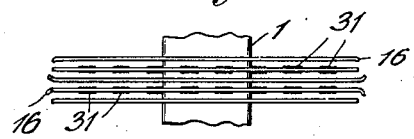
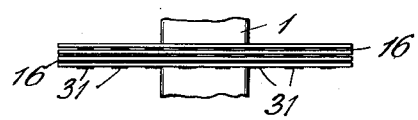
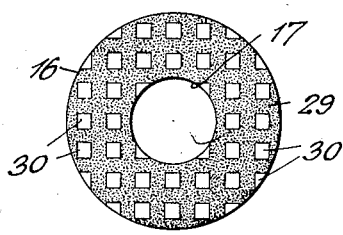
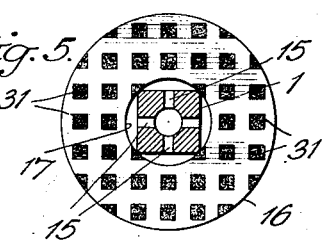
INVENTORS
FREDERICK D. HERBERT
WALDO L. KRAEMER
JOSEPH E. GARRABRANT
BY
Stockbridge & Borst
ATTORNEYS.

Patented July 24, 1928.

1,677,892

UNITED STATES PATENT OFFICE.

FREDERICK D. HERBERT, OF UPPER MONTCLAIR, NEW JERSEY; WALDO L. KRAEMER, OF BROOKLYN, NEW YORK; AND JOSEPH E. GARABRANT, OF BLOOMFIELD, NEW JERSEY, ASSIGNORS TO METAL EDGE FILTER CORPORATION, A CORPORATION OF NEW JERSEY.

FILTER.

Application filed June 13, 1924. Serial No. 719,695.

This invention relates to filters and particularly to the type known as edge filters in which the filtration occurs at the edges of abutting surfaces. Attempts have been made to provide filters of this type in which a pack of sheet-like filtering elements is provided, but where the sheet-like elements are paper, they are, under the action of a liquid, unable to withstand the pressures to which they must frequently be subjected in order to force the liquid through the filter. Where other materials are used, difficulty has been experienced in obtaining the proper and accurate spacing between the abutting faces of the filter elements of the pack. Difficulty has also been experienced in prior filters of this type, due to the obstruction to flow of the fluid caused by the collection of the separated particles along the somewhat irregular surface of the pack. The construction of prior filters of this type also has not been such that they may be readily cleaned in a very simple manner.

An object of this invention is to provide an improved edge filter which will have a maximum strength, durability and efficiency; which will withstand, without rupture, relatively high pressures upon the fluid to be filtered; with which the obstruction from separated particles adhering to the filtering edges will be reduced to a minimum; with which the filtering edges and chamber may be readily cleaned of separated particles in an exceptionally simple and practical manner; and which will be compact, and relatively inexpensive. A further object is to provide an improved filter element and unit for edge filtration, which will be remarkably efficient, durable, relatively inexpensive, capable of withstanding high pressures and which will be unaffected by liquids. Various other objects and advantages will be apparent from the following description of an embodiment of the invention, and the novel features will be particularly pointed out hereinafter in connection with the appended claims, which form a part of this specification.

In the accompanying drawing:—

Fig. 1 is a sectional elevation of a filter constructed in accordance with the invention;

Fig. 2 is an elevation of a portion of the filter pack or unit with the filter sheets slightly spaced and when first assembled before they are clamped together;

Fig. 3 is a similar elevation after the sheets or filter elements have been clamped together and the filtering edges trued;

Fig. 4 is a plan of one of the filter elements in the process of manufacture; and Fig. 5 is a transverse section through the pack to show a face of one of the filter elements, the section being taken substantially along the line 5—5 of Fig. 1.

In the illustrated embodiment of the invention, an elongated member or spindle 1 is provided with a shoulder 2, and a reduced threaded extension 3 which connects with the main body at the shoulder 2. A flange or plate 4 is passed over the reduced extension 3 and against the shoulder 2, being secured against the shoulder by a washer 5 and a nut 6 which is threaded upon the reduced extension 3. The face of the flange 4, upon the side from which the main body of the spindle extends, is provided with an annular groove 7 in which a gasket 8 may be disposed, and a tubular casing 9 is fitted at its open end in the groove 7 and against the gasket 8. The tubular casing may be secured to the flange in any suitable manner, but as a satisfactory method of attachment, a plurality of swing bolts 10 may be hinged at 11 to the casing and adapted to enter slots 12 in the overhanging periphery of the flange 4. Nuts 13 threaded upon the ends of the bolts and against the flange will draw the casing tightly to the flange.

The reduced extension 3 is provided with an internal passage 14 which extends from its free end to a point within the body of the spindle 1, and the body of the spindle is provided with a plurality of passages 15 leading from its periphery to the passage 14.

A plurality of filter elements or sheets 16 in the form of metal sheets or discs and provided with central apertures 17, are arranged in superposed relation face to face to form a pack with the apertures of the sheets or discs aligned. The filter elements are fitted over the elongated member or spindle 1 by passing the latter through the aligned apertures, and a plate 18 is fitted over the spindle and against the outer face of the last sheet or disc so as to confine the sheets or discs together in the pack. A nut 19 is threaded upon a threaded extension 20 of the elongated member 1 and abuts against the plate 18, so that when the nut is tightened, it will force the plate 18 towards the flange 4 and compress the pack of filter sheets or discs together and against the flange 4. The nut 19 and plate 18 also close the passage formed by the aligned apertures 17.

The body of the elongated member or spindle 1, within the passage formed by the aligned apertures 17, is different in cross section from the apertures, so that while the elongated member or spindle serves as a locating, centering, or confining frame or base for the filter pack, it will not entirely fill the apertures 17, and any fluid in the aligned apertures may pass along the member or spindle 1 and thence through the passages 15 into the passage 14 of the reduced extension.

The casing at the end opposite the flange 4 may be closed by a removable cap 21, a suitable gasket 22 being interposed between the cap and the casing, and a drainage plug 23 may be threaded into the cap. An inlet pipe 24 may enter the casing 9 through the lateral wall thereof, and may be connected by a suitable union 25 to a supply conduit 26 from the source of fluid to be filtered. The reduced extension 3 may be connected by a suitable union 27 to a conduit 28 for the removal of the filtrate.

The fluid to be filtered, sometimes referred to as the pre-filt, is introduced under pressure into the interior of the casing 9, and since the interior of the casing 9 is larger than the filter pack, this fluid may pass entirely around the periphery of the pack. This fluid being under pressure, tends to work its way through the spaces between the sheets or elements and into the aligned apertures 17, thence along the spindle or elongated member 1 and through the passages 15 and 14 to the disposal conduit 28. The particles of suspended matter that are carried by the introduced fluid and which are too large to pass through the spaces between the filter elements or sheets, will be held back or retained at the edges of the filter elements or sheets, and the fluid or filtrate will pass through without this suspended matter.

In order to provide a slight spacing between the abutting faces of the filter discs, sheets or elements, through which spaces the fluid may pass, the discs, sheets or elements are provided with a plurality of spaced surface elevations upon at least one face of each pair of abutting surfaces of the pack, thus forming thin channels between the spaced elevations from the periphery of the sheets or discs to the apertures 17.

These surface elevations may be provided upon both of the abutting faces between each pair of filter sheets, discs or elements, but since this spacing may be as easily accomplished by having the elevations only upon one of the faces of each pair of abutting surfaces, this latter is preferable. The elevations may, if desired, be provided upon only one face of each sheet, and the sheets arranged with the elevations abutting the plain face of the adjacent sheet, but as illustrated, the elevations may be provided upon both faces of each alternate sheet, disc or element, in which case the other alternate discs or sheets will have perfectly plain surfaces. This last arrangement has several advantages, one of which is that with this arrangement, it is only necessary to provide the elevations upon half the number of sheets, discs or filter elements which comprise the pack.

The filter sheets, discs or elements, may be made from any suitable impervious material, preferably metal, and the elevations are preferably provided thereon by the electro-deposition thereon of suitable metal. By the electro-deposition of the elevations, they may be made minutely small both in height and in extent, and may be very accurately and uniformly controlled as to thickness of the deposition. For example, by varying the time during which the deposition occurs and the current density, the thickness may be very accurately varied and controlled, and very accurate uniformity of the height of the elevations thus obtained.

The electro-deposition of these elevations may be accomplished by any of the usual methods employed in electrolytic work, but a very satisfactory and practical method has been devised which will now be explained. The surfaces of the discs or sheets are coated with a suitable adherent insulating material at all points except where the elevations are to be placed, and thus when these coated elements or sheets are subjected to an electro-plating action, the electrolytic deposit of metal will be only on those places which are exposed through the insulating material. After the desired thickness of the elevations has been obtained, the elements may be removed from the electrolytic bath and the insulating material removed, which provide the finished filter sheets or elements.

The covering of the sheets or elements, except at the points where the elevations are desired, may be conveniently accomplished by printing a coating upon the faces of the elements, utilizing a printing liquid which has an insulating base, such as paraffin. The device by which this transfer or printing is obtained will have spaces or depressions in its surface corresponding to the areas to be occupied by the elevations, and the transfer or printing may be accomplished very much the same as in the manner of printing by a rubber stamp. For example, if printer's ink is combined with paraffin, a rubber stamp may be advantageously used for the printing operation.

A filter sheet or disc coated by the printing operation in this manner is illustrated by Fig. 4 in which the coating is designated by the reference 29 and the open spaces corresponding to the areas to be occupied by the elevations are designated by the reference 30. The elevations are then placed on the filter sheets by electro-deposition, after which the ink with the paraffin base is removed leaving the elevations exposed. The face of such sheets will then appear somewhat as shown in Fig. 5, the elevations being designated by the reference 31. The elevations also are designated by the reference 31 in Figs. 2 and 3.

In the illustrated embodiment of the invention, the sheets are circular discs with a central circular aperture 17, and the body of the spindle or elongated member 1 is square in cross section, the diagonal of the square being approximately equal to the diameter of the apertures 17. In this manner, the spindle 1 will accurately align and center the superposed discs, and at the same time the flat faces of the spindle will provide channels along the aligned apertures through which the filtrate may pass. The central spindle, in addition to aligning the discs before they are clamped together into the pack, also serves to equalize the pressure upon the discs thereby obtaining a more uniform spacing between the abutting faces of the discs.

The sheets of metal of which the filter elements are formed, may be cut to the desired size in any suitable manner such as by stamping the same from sheets of stock material, but in the usual methods of manufacture, the discs will not always have exactly the same peripheral surface, burrs may be formed, and the edges may be slightly bent or turned by the stamping operation. All of these factors would interfere to some extent with the proper spacing between the faces of the sheets. Also when the sheets are brought together into a pack, unless they are accurately centered, some will project more to one side than others, with the result that minute ledges along the peripheral surface of the pack will be produced.

During the filtering operations, where such ledges are allowed to remain, the separated particles of matter will collect on these ledges and be held at the filtering edge, thereby obstructing the free flow of fluid through the filter pack. After the sheets have been assembled in the pack and clamped together by the spindle or other clamping means, the unit thus provided is machined so as to remove the peripheral portion of the pack, thereby removing any projecting ledges and turned over or burred edges, and providing a smooth peripheral surface. The unit may then be enclosed in the casing and the filtering operation started.

The discs as assembled prior to clamping are shown in Fig. 2, the irregularities in the peripheries being exaggerated to some extent to show the problem existing, and the clamped sheets, after truing, are shown in Fig. 3. The machining of the filter pack may be effected in any suitable manner such as by means of a grinding wheel, or a buffing wheel, or in some instances by suitable machine tools.

In the assembly of this filter, the casing 9 is removed so that the filter sheets may be assembled upon the spindle or elongated member 1 and against flange 4. The plate 18 and nut 19 are then placed over the end of the spindle and against the last sheet of the pack and the pack compressed by tightening the nut 19. By tightening the nut 19, the spaces between the discs or sheets may be varied to a limited extent, but ordinarily the spacing, under compression, will be that created by the spacing elevations on the faces of the sheets. The periphery of the pack is machined as hereinbefore explained, and the filter then assembled as shown in Fig. 1.

The fluid to be filtered is introduced under pressure through the pipes 24 and 26 into the tubular casing, from which it passes along the periphery of the pack and thence through the thin channel spaces between the abutting faces of the sheets into the aligned apertures 17, thence along the same and out through the passages 15, 14 and conduit 28. All particles of suspended matter which are carried by the fluid and which are too large to pass through the thin channels, will be held back at the edges of the pack, the separated particles settling to some extent to the bottom of the casing.

In order to clean this filter, the plug 23 may be removed which will allow the contents of the casing to escape and carry the separated suspended matter. Since the periphery of the pack is very smooth, there will be little trouble from adhering particles of the separated matter, but if desired, the spindle and filter sheets carried thereby may be removed as a unit and the periphery of the pack cleaned with a brush or by swishing it around in a quantity of suitable cleaning fluid, after which it may be replaced and the filtering operation resumed. The pack may also be cleaned directly when the casing is removed.

It will be noted that with this arrangement it is unnecessary to separate the sheets of the pack in order to clean it or to remove the pack from the supporting spindle, since the filtration or separation occurs at the periphery of the pack. The metal sheets are extremely strong and durable, and will not rupture under the high pressure which occasionally is placed upon the fluid to be filtered in order to force it through the filter. The metal sheets will not be softened or injured by the fluids to which they are usually subjected, such as would be the case with paper sheets. It will also be noted that the spacing may be very accurately and uniformly determined by using the electro-deposited metal for the spacing elevations, with the result that a very sharp line of filtration may be obtained.

The device is exceptionally simple and relatively inexpensive, and will withstand severe usage without injury or loss of efficiency. Such a filter has been found to be extremely useful for inclusion in pressure lubricating systems of motor vehicles, the filter separating out the solid particles of suspended metal, carbon and other materials, and restoring the contaminated oil to its original color and condition.

It will be understood that various changes in the details and arrangements of parts, herein described and illustrated for the purpose of explaining the nature of the invention, may be made by those skilled in the art within the principle and scope of the invention as expressed in the appended claims.

We claim:

1. A filter comprising a pack of apertured superposed metal sheets, abutting face to face with apertures aligned, at least one face of each pair of abutting faces of the sheets having a plurality of electro-deposited slight spacing elevations thereon, thereby forming thin channels between the sheets and running to the aligned apertures, and means for causing a flow of the fluid to be filtered through said thin channels, whereby the suspended particles too large to pass through the channels will be separated and held back.

2. A filter comprising a pack of apertured superposed metal sheets, abutting face to face with apertures aligned, at least one face of each pair of abutting faces of the sheets having a plurality of electro-deposited slight spacing elevations thereon, thereby forming thin channels between the sheets and running to the aligned apertures, means for causing a flow of the fluid to be filtered through said thin channels, whereby the suspended particles too large to pass through the channels will be separated and held back, and means for placing and holding the pack under pressure so as to reduce the spaces between the discs to the height of the said elevations on the faces of the discs, the spacing between the sheets determining the fineness of the filtering operation.

3. In a filter for edge filtration, a spindle, a plurality of filter elements mounted thereon, each element comprising a sheet of metal having upon a face thereof a plurality of spaced elevations of electro-deposited metal, the thickness of the electro-deposited metal being that of the desired spacing between the abutting faces of filter elements.

4. In a filter for edge filtration, a filter unit comprising a spindle, a pack of superposed filter sheets clamped together on said spindle and having a plurality of spaced elevations of electro-deposited metal on one face of each sheet, the thickness of the electro-deposited metal being that of the desired spacing between abutting faces of filter sheets.

5. In a filter for edge filtration, a spindle, a plurality of filter elements of sheet metal, each element having upon a face thereof an adherent spacing layer of electro-deposited non-fibrous material.

In witness whereof, we hereunto subscribe our signatures.

FREDERICK D. HERBERT.
WALDO L. KRAEMER.
JOSEPH E. GARABRANT.